US009682645B2

United States Patent
Barber

(10) Patent No.: US 9,682,645 B2
(45) Date of Patent: Jun. 20, 2017

(54) TRANSPORTER

(71) Applicant: MMD Design & Consultancy Limited, Somercotes (GB)

(72) Inventor: Richard Barber, Somercotes (GB)

(73) Assignee: MMD Design & Consultancy Limited, Somercotes (GB)

( * ) Notice: Subject to any disclaimer, the term of this patent is extended or adjusted under 35 U.S.C. 154(b) by 57 days.

(21) Appl. No.: 14/443,960

(22) PCT Filed: Nov. 26, 2013

(86) PCT No.: PCT/GB2013/053112
§ 371 (c)(1),
(2) Date: May 19, 2015

(87) PCT Pub. No.: WO2014/083323
PCT Pub. Date: Jun. 5, 2014

(65) Prior Publication Data
US 2015/0314719 A1 Nov. 5, 2015

(30) Foreign Application Priority Data

Nov. 27, 2012 (GB) .................................. 1221298.1

(51) Int. Cl.
*B60P 1/02* (2006.01)
*B60P 3/00* (2006.01)

(52) U.S. Cl.
CPC .. *B60P 1/02* (2013.01); *B60P 3/00* (2013.01)

(58) Field of Classification Search
CPC ............... B60P 1/02; B60P 3/00; B65D 55/06
(Continued)

(56) References Cited

U.S. PATENT DOCUMENTS 3,160,284 A   12/1964   Moore
3,689,090 A * 9/1972   Dunaevsky ............ B60G 17/00
                                                                172/4.5
(Continued)

FOREIGN PATENT DOCUMENTS

DE   2926028 A1   2/1981
DE   3711232 A1   10/1987
(Continued)

OTHER PUBLICATIONS

English Translation of FR 2705630.*
Nordlund, Jan, "International Search Report," prepared for PCT/GB2013/053112, as mailed Feb. 21, 2014, five pages.

*Primary Examiner* — Kaitlin Joerger
(74) *Attorney, Agent, or Firm* — Winstead PC

(57) ABSTRACT

A transporter for the transport of a large payload across an uneven ground surface is described. The transporter has a body (4); ground contacting transport means below the body, provided with drive means (1,2) to move the body across a ground surface in use; a payload support module (5) to support a payload above the body in use; and a plurality of elongate extendable elevators (6) each having a first articulated joint (17) with the body at a first end and a second articulated joint (13) with the payload support module at a second end. It is characterised in that each of the plurality of elongate extendable elevators is independently operable so as to enable the elongate extendable elevators (6) together to vary both the height and the attitude of the payload relative to the body; and in that at least one of each of the first (17) or second (13) articulated joints comprises a rotationally restricted joint that allows the elongate extendable elevator (6) to pivot relative to an axis orthogonal to its elongate direction but acts to prevent its rotation about an axis parallel to its elongate direction. The elongate extendable elevators are the means both by which the payload is lifted and by (Continued)

which the attitude of the payload is adjusted to enable it to balance.

20 Claims, 5 Drawing Sheets

(58) Field of Classification Search
USPC .................................................. 414/495, 458
See application file for complete search history.

(56) References Cited

U.S. PATENT DOCUMENTS

| | | | | |
|---|---|---|---|---|
| 4,650,017 A * | 3/1987 | Pelletier | ............... | A01G 23/083 |
| | | | | 180/41 |
| 5,379,842 A * | 1/1995 | Terry | ........................ | B60G 3/00 |
| | | | | 180/21 |
| 6,105,699 A * | 8/2000 | Hinds | .................. | B62D 33/063 |
| | | | | 180/89.13 |
| 6,173,973 B1 * | 1/2001 | Robinson | ............. | B62D 33/063 |
| | | | | 144/34.1 |
| 7,832,740 B2 * | 11/2010 | Kim | ........................ | E02F 9/028 |
| | | | | 180/89.15 |
| 8,028,783 B2 * | 10/2011 | Rust | ..................... | B62D 33/067 |
| | | | | 180/89.14 |
| 2009/0088933 A1 * | 4/2009 | Kim | ..................... | B62D 55/116 |
| | | | | 701/50 |
| 2009/0115148 A1 | 5/2009 | Kim et al. | | |
| 2009/0314566 A1 | 12/2009 | Rust | | |
| 2010/0327569 A1 | 12/2010 | Bourn | | |
| 2012/0183382 A1 | 7/2012 | Couture et al. | | |
| 2012/0282070 A1 * | 11/2012 | D'Andrea | ............... | B66F 9/063 |
| | | | | 414/495 |
| 2015/0125252 A1 * | 5/2015 | Berzen Ratzel | ....... | B62D 12/02 |
| | | | | 414/800 |
| 2016/0167557 A1 * | 6/2016 | Mecklinger | ............. | B66F 9/063 |
| | | | | 414/495 |
| 2016/0209847 A1 * | 7/2016 | Kuegle | ..................... | B60P 1/02 |
| 2016/0231751 A1 * | 8/2016 | Mecklinger | ............. | B66F 9/063 |

FOREIGN PATENT DOCUMENTS

| | | |
|---|---|---|
| DE | 19706845 A1 | 8/1998 |
| EP | 0129806 A2 | 1/1985 |
| FR | 2314077 A1 | 1/1977 |
| FR | 2377296 A1 | 8/1978 |
| FR | 2602725 A1 | 2/1988 |
| FR | 2705630 A1 | 12/1994 |
| JP | S643000 A | 1/1989 |
| KR | 20120050357 A | 5/2012 |
| SU | 1411176 A1 | 7/1988 |
| WO | WO-9901329 A1 | 1/1999 |

\* cited by examiner

TRANSPORTER

FIELD OF THE INVENTION

The invention relates to a transporter for the transport of a large payload across an uneven ground surface. The invention relates in particular to a transporter for the transport of a semi-mobile processing apparatus, for example for use in opencast mining, quarrying and like operations, from one location to another.

BACKGROUND TO THE INVENTION

In respect of a wide range of industrial applications, including but by no means limited to applications in open cast mining and quarrying, there is often a requirement to make use of heavy plant or apparatus at a first working location for a period of time, which then requires moving to another working location. Where such apparatus or plant is moved only occasionally, with long intervening periods of static operation, it is not likely to be necessary to make it fully mobile by provision of an integral transport system. Instead, it is typical to use an external transporter to move the apparatus as and when required.

A typical transporter may comprise a supporting chassis or body provided with ground contacting transport means, such as in a typical case a pair of crawler tracks, and having a support apparatus on which a payload comprising such apparatus or plant to be moved can be carried.

In a typical mode of operation, a support apparatus is provided which can be raised and lowered. This may for example be in the form of a payload support platform with suitable means to raise and lower it and thus raise and lower the payload. At its lowered configuration, the transporter may be driven into a position underneath the apparatus to be moved. The platform or other support apparatus is then raised to support the apparatus to be moved above the ground, and the transporter is driven to move the apparatus. The support platform may be raised, lowered and tilted by suitable extending shafts, pistons or the like.

The payloads carried by such transporters are typically very heavy. The terrain over which the payloads are transported can be rough, and include significant undulations and gradients. The payload needs to be lifted clear of such rough terrain to be transported, but the resultant arrangement is potentially top-heavy and unstable. The safe and stable support of the payload during lifting and transportation is a significant concern. In particular, if the payload centre of gravity is off centre, the effect of ground undulations and gradients can be exaggerated to impart significant torque on any shafts, pistons or the like that raise or lower the platform. Slewing operation is typically impractical. Instead transporters may effect a static turn or may be required to drop the payload, move, and then reload.

SUMMARY OF THE INVENTION

In accordance with the invention, a transporter for the transport of a large payload across an uneven ground surface comprises:
 a body;
 ground contacting transport means below the body, provided with drive means to move the body across a ground surface in use;
 a payload support module to support a payload above the body in use;
 a plurality of elongate extendable elevators each having a first articulated joint with the body at a first end and a second articulated joint with the payload support module at a second end;
 wherein each of the plurality of elongate extendable elevators is independently operable so as to enable the elongate extendable elevators together to vary both the height and the attitude of the payload relative to the body;
 and wherein at least one of each of the first or second articulated joints comprises a rotationally restricted joint that allows the elongate extendable elevator to pivot relative to an axis orthogonal to its elongate direction but acts to restrict and for example to prevent its rotation about an axis parallel to its elongate direction.

A transporter in accordance with the invention is particularly intended for use with large plant and apparatus which needs to be occasionally relocated across an uneven ground surface. Such large apparatus is not typically self-propelled. Instead, it requires a separate transporter on which it can be supported, raised above the ground surface for transport, and thereby moved.

The need to raise such a potentially heavy payload to a height where it can be transported across significantly uneven and potentially inclined terrain, whilst at the same time balancing the payload in a stable manner, presents conflicting requirements on the system.

The invention solves these in admirable manner, in that the elongate extendable elevators are the means both by which the payload is lifted and by which the attitude of the payload is adjusted to enable it to balance. The elevators are positioned to project upwardly from the body and actuatable to extend to bear on the payload support module and enable it to support a payload thereon in use. Extension of the elevators bearing on the payload support module supports, lifts and lowers the payload. Differential operation of the elevators varies the attitude of the payload to the horizontal in particular by tilting the payload support module.

A particular problem with uneven terrain is stability, particularly where the centre of gravity of a heavy payload is likely to be offset from ideal. In particular, the effect of ground undulations and gradients can be exaggerated to impart significant torque on the elongate extendable elevators that raise or lower the payload support module.

The transporter of the invention accommodates this by providing an articulated joint between each extendable elevator and the body at a first end and a second articulated joint between each extendable elevator and the payload support module at a second end and providing that at one or other of the connection between the body and the elongate extendable elevators or the payload support module and the elongate extendable elevators (and optionally at both) the articulated joint is a rotationally restricted joint which is configured to limit the degree of rotational freedom permitted at the joint at least to the extent as to prevent rotation about an axis corresponding to the elongate direction of the elevator. The elevator can tilt at this joint, but it cannot rotate. This particular combination makes the system better able to accommodate uneven terrain, particularly where the centre of gravity of a heavy payload is likely to be offset from ideal.

At least one of each of the first or each of the second articulated joints comprises a rotationally restricted joint that allows the elongate extendable elevator to pivot relative to at least one axis orthogonal to its elongate direction but acts to restrict and for example to prevent its rotation about an axis parallel to its elongate direction. Preferably the rotationally restricted joint is configured to allow the elongate extendable elevator to pivot relative to a pair of axes orthogonal to its elongate direction, and for example a pair of orthogonal axes, but to prevent its rotation about an axis parallel to its elongate direction. The elevator can thus tilt with full directional freedom at this joint, but it cannot rotate about its length (or, from an alternative perspective, allow the body or payload support module as the case may be articulated thereon to tilt in any direction thereon but not to rotate thereabout).

The rotationally restricted joint is conveniently configured to prevent rotation of the elongate extendable elevator about an axis parallel to its elongate direction but to permit the pivoting of the elongate extendable elevator about an axis perpendicular to its elongate direction and for example in the preferred case about a pair of axes orthogonal to its elongate direction and is conveniently a gimbal joint.

The rotationally restricted joint is for example a gimbal joint comprising a pair of single axis gimbal modules one mounted upon the other with orthogonal pivot axes, thereby being such as to allow rotation about the said pair of pivot axes but not to allow rotation about a third axis perpendicular thereto.

At least one of the articulated joints is rotationally restricted as described. The other articulated joint may allow three full degrees of freedom of rotation, and may for example be a ball joint. The key to the invention however is that at least one of the joints is not a ball joint, but does not allow rotation of the elevator and thus resists torque loads arising from an imbalance away from the ideal condition of the payload.

In such a case conveniently therefore each one of the first or alternatively each one of the second articulated joints is a rotationally restricted joint with each one of the other joint conveniently then being configured to allow three full degrees of freedom of rotation. Most conveniently, each of the first articulated joints between the body and a first end of the elongate extendable elevator is a rotationally restricted joint such as a gimbal joint as above described. Thus, the elevator can tilt at this joint, and in a preferred case can tilt with two degrees of freedom about two orthogonal axes in a plane parallel to the plane of the body, but it cannot rotate about its long axis. Each second articulated joint between the payload support module and a second end of the elongate extendable elevator may be configured to allow three full degrees of freedom of rotation, and may for example be a ball joint.

Such a combination enables the system better to accommodate uneven terrain, particularly where the centre of gravity of a heavy payload is likely to be offset from ideal, in that not only is the length of each extendable elevator independently variable but also its articulation is independently variable, in effect to vary the effective attitude of the body and/or support module relative to the extendable elevator independently at each joint. The combination of independently extendable elevators with articulated joints configured to be rotationally restricted to prevent rotation of the elongate extendable elevator about an axis parallel to its elongate direction but to permit the pivoting of the elongate extendable elevator about an axis perpendicular to its elongate direction, and in particular the provision of a gimbal joint for this purpose as above described gives a particularly effective balance between the need for stability as regards the support platform as a load bearing and transporting unit and the need for multiple degrees of freedom of articulation to accommodate uneven terrain and control attitude of the support platform.

In a preferred case, each elevator has a load sensor linked to a common central control module, which common central control module is adapted to determine from the relative load on each elevator the location of the centre of gravity of the payload. The provision of load sensors within the elevator system allows the elevators themselves to be the means by which information about the balance of the payload is fed back to a central control unit, so that the balance can be in effect self-referencing, and the load can be both lifted and held stably by a single apparatus.

The invention in this embodiment offers an admirably simple system in which the payload support module is able both to lift the load, hence allowing the load to be transported across uneven terrain, and to keep the load balanced by means of a self-referencing tilting mechanism.

The elongate extendable elevators are positioned to project upwardly from a lower articulated joint engaged with the body to an upper articulated joint with a payload support module adapted to bear upon a payload to support and lift it in use. A payload support module may support and lift a payload directly or indirectly. For example a payload support module may comprise a payload support platform. In such an embodiment each elongate extendable elevator extends between the body and the payload support platform, and is actuatable to raise and lower the support platform in use and thereby raise and lower a payload thereon.

In this embodiment it can be seen that the elongate extendable elevators are the means both by which the payload support platform is lifted and by which the attitude of the payload support platform is adjusted to enable dynamic balance of the payload. Extension of the elevators acting on the payload support plate lifts the payload support platform. Differential operation of the elevators effects a tilting action on the payload support platform. The rotationally restricted joints accommodate torque loads attributable to off centre payloads as the attitude of the payload support platform varies over inclined terrain and/or as the payload support platform is tilted.

The inclusion of load sensors as an integral part of each actuator means that the system can be to some extent self-referencing, and the support platform on which the payload is supported can be tilted by differential operation of the various actuators in order to keep the centre of gravity of the payload in a stable position.

In typical operation, a transporter in accordance with the invention will have two particular modes, a travel mode, and a lift mode. In travel mode, the transporter moves across the ground surface (with or without a payload). This is effected by means of the ground contacting transport means on which the body of the transporter, and hence the payload where present, are supported. Suitable drive means are provided to effect operation of the ground contacting transport means in travel mode to cause the transporter to be propelled across the ground.

In a second mode of operation, the transporter operates in lift mode. Typically, the transporter will be driven underneath a payload. The elongate extendable elevators will be extended, for example in turn, to engage with the load. In a convenient mode of operation, elevators may be extended sequentially until each sees an equal pre-determined active load. When all elevators are in a loaded position the elevators may extend to raise the payload support module and thus raise the payload.

Each elevator is actuatable in lift mode to extend in length and thus to take up its share of the payload lifting and supporting role. Each elevator shares in the raising of a common payload support module such as a payload support platform. The actuators are operatable independently so as to enable them to vary the attitude of the payload support module at the same time as the payload is lifted to a suitable height for transport, ensuring stable operation in lift mode, and similarly to effect a dynamic correction in response to transient changes of the payload centre of gravity as the transporter is moved across uneven terrain so as to maintain safe balance of the payload.

The load sensors will feed back information to the central control system to enable a dynamic monitoring and/or maintenance of centre of gravity both as the system lifts the payload to maintain the payload in safe operational parameters, and subsequently as the payload is transported across potentially uneven terrain.

An elevator conveniently comprises a ram, piston or like extending load-bearing structure, and is for example a hydraulic ram or piston drive.

An array, for example of at least three elevators, and in a particular preferred case of four elevators, is conveniently provided. Each elevator is then provided at the apex of a notional polygon, which is preferably centred on or towards a notional most stable payload centre of gravity position. For example the elevator array is notionally centred at or towards the centre of the payload support platform. The notional polygon defined by the elevator array is preferably a regular polygon and for example a square. Each elevator in the array may be identical.

In a typical mode of operation, a safe working configuration could for example be defined by defining at least one notional circle about the above defined central point, which represented a stable target location for the centre of gravity of the payload. The incorporation of load sensors into each elevator means that the elevators themselves can provide constant and a dynamic feedback of the centre of gravity as it moves from this safe target. This could for example be displayed in suitable display means to an operator and/or fed to an automatic control system which could effect dynamic correction of the payload attitude to bring the centre of gravity back towards a more stable position during use. Control means may act to disable operation of the drive means when in an unsafe configuration.

An alarm system may be provided to give indication of an unsafe or unstable configuration, for example as above defined. Additionally or alternatively, control means may be set up to inhibit or prevent operation of the transporter or of certain functions in an unsafe or unstable configuration, for example as above defined.

In a preferred embodiment, the transporter preferably also provides for a slewing operation (that is, for a rotation about a vertical axis/an axis perpendicular to the plane of the payload support module). For example, such as a payload support plate may be in two parts, with a lower support portion engaged with and tiltable by the action of the extendable elevators, and an upper portion on which the payload is supported in use rotatable relative to the lower portion. This gives a rotation about a vertical axis or slewing action in addition to the lifting and tilting actions, and confers particular flexibility on the transporter in operation. This slewing action may be controlled however, for example by suitable gearing, and may be distinguished from the uncontrolled rotation about an elongate elevator that the invention is specifically adapted to prevent.

It is a particular advantage of the transporter of the present invention that the additional stability of the underlying design facilitates adaptation to such slewing operation. It is a disadvantage of prior art transporters of generally equivalent purpose that such a slewing operation is typically impractical. Instead such transporters may for example perform a static turn drop the payload, move, and then reload.

In a further advantage, a transporter in accordance with the invention is admirably suited to remote operation via suitable remote control means. It does not require driver operation via a cab integral to the transporter. In a particular preferred embodiment, the transporter includes a central control unit capable of communicating with remote user-operatable control means.

For overland transport in travel mode, the transporter includes a suitable overland drive system including the ground contacting transport means which support the body, and hence the payload where applicable, above the ground. A suitable overland drive may include for example a transversely spaced pair of ground contacting rolling drives either side of a central body, which may for example be in the form of wheels, endless crawler tracks etc. In a particularly preferred embodiment, a pair of crawler tracks located transversely either side of the central body is likely to be preferred as giving a low profile and most effective traction over difficult terrain.

For the avoidance of doubt, it should be understood that where reference is made herein to components of the invention or to directions being horizontal or vertical, or to angles being orthogonal, this is for convenience of understanding of relative geometry only, and is made with reference to a neutrally loaded state on flat ground in which a horizontal body and a horizontal support module have perpendicularly extending elevators between them. No limitation of general principle should be inferred beyond this. It will be readily understood from the foregoing that the specific purpose of the invention is to accommodate other configurations in use in particular cases where the ground is not flat and/or the transporter is not neutrally loaded and/or the elevators are angled from perpendicular and/or and the support module is tilted from the horizontal.

DETAILED DESCRIPTION OF THE ILLUSTRATED EMBODIMENT

Figure 1:
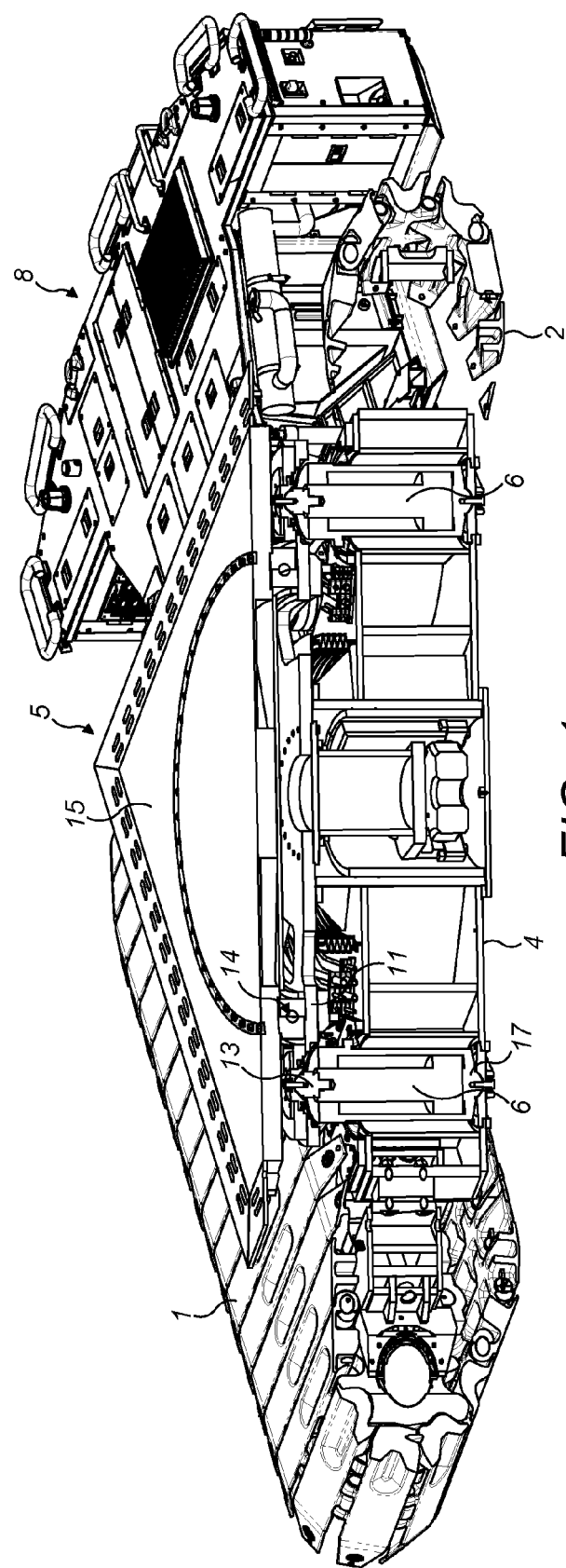
FIG. 1 is a half cutaway perspective view of a transporter of an embodiment of the invention.
Figure 2:
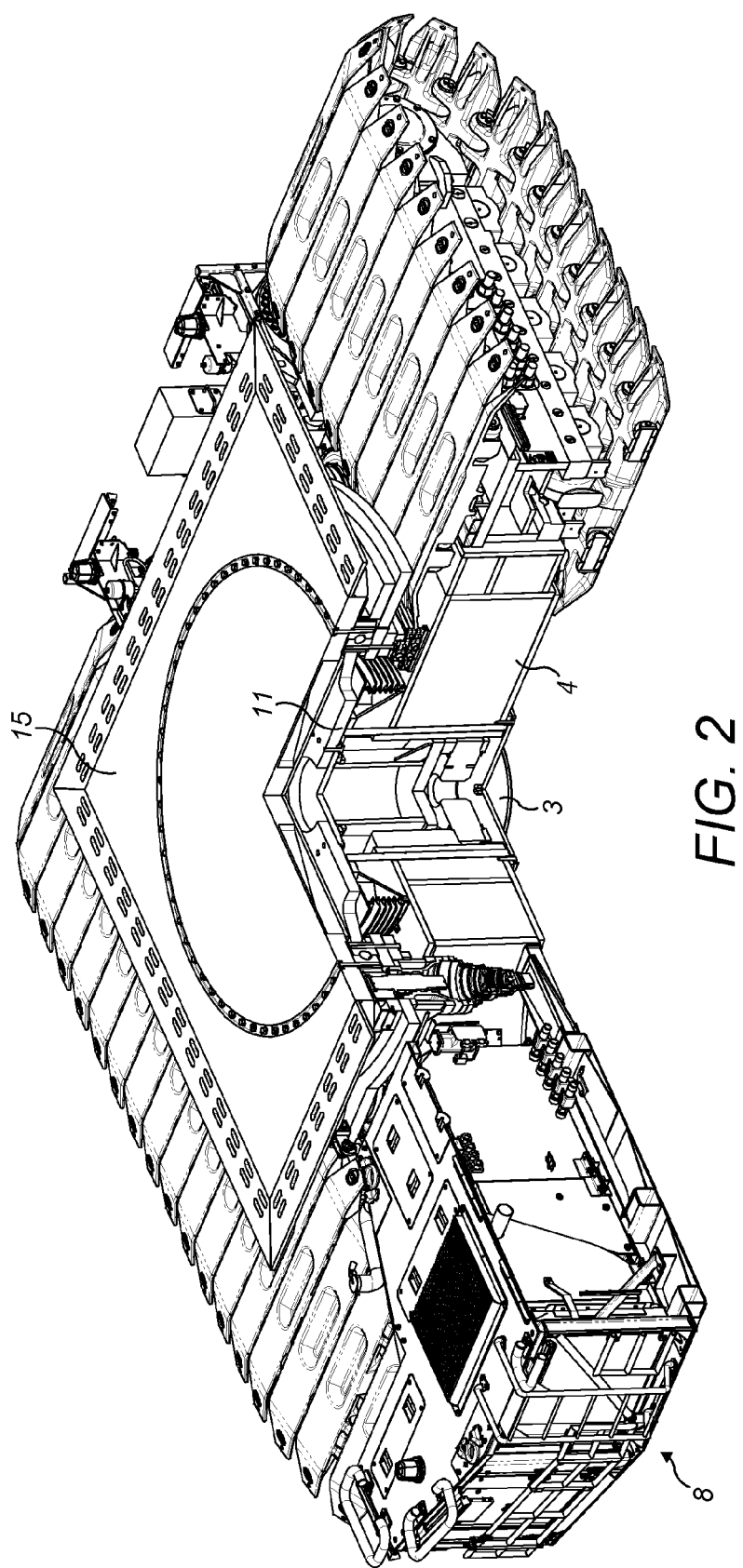
FIG. 2 is a similar view with an alternative cutaway.

In the example embodiment of the invention shown in FIGS. 1 and 2, a transporter includes a pair of track crawler assemblies (1, 2) transversely located either side of a transporter car body assembly (4). A centre guide assembly (3) supports a support platform assembly (5). Four hydraulic lifting rams (6) occupy each corner of the car body in a square array. Each hydraulic lifting ram is provided with a load cell to detect the load on the lifting ram and feed this back to a central control unit. An engine and hydraulic power pack assembly (8) drives the crawlers in travel mode.

The lifting mechanism is shown most clearly with reference to FIG. 1. In FIG. 1, a pair of hydraulic lifting rams (6), can be seen in cutaway section. Each hydraulic lifting ram extends to bear upon a lower plate (11) of the support platform assembly. A spherical joint (13) at the top of the ram (6) makes an articulated connection between the ram (6) and the lower plate (11). The lower plate (11) is connected to an upper plate (15) on which the payload is directly supported in use. Relative rotation between the two plates (11, 15) is enabled by the joint (14). In this way, a slewing action can be effected of the upper plate (15), and hence of the supported load, in a controlled manner, and without putting undue torque stresses or the like on the ram (6).

Differential operation of each ram (6), and the provision of the articulated joints (13) between the top of the rams and the support platform assembly (5), and further articulated joints (17) between the base of the rams and the body (4), together cooperate so that the rams in use can both lift and tilt the platform, raising the payload while ensuring that it remains stable and balanced if rough and/or inclined terrain is encountered.

As has been discussed above, maintaining a stable balance for the payload, and in particular dealing with the stresses which arise from an off-centre payload, particularly when traversing undulating or inclined ground, is an acknowledged problem in relation to transporters. A particular problem arises when an off-centre load is being transported on an incline, as this will tend to induce torque stresses on the rams (6). To resist these torque stresses, and in particular to resist any tendency for the rams to rotate, the lower joints (17) by means of which the rams make an articulated engagement with the body (4) are of a gimbal type, shown in greater detail in FIGS. 3 to 5, which allows two degrees of freedom of tilt but does not allow rotation about a longitudinal axis of the ram (6).

The arrangement provides in effect a pair of gimbal joints with orthogonal pivot axes, each consisting of a pair of housed rollers.

Figure 3:
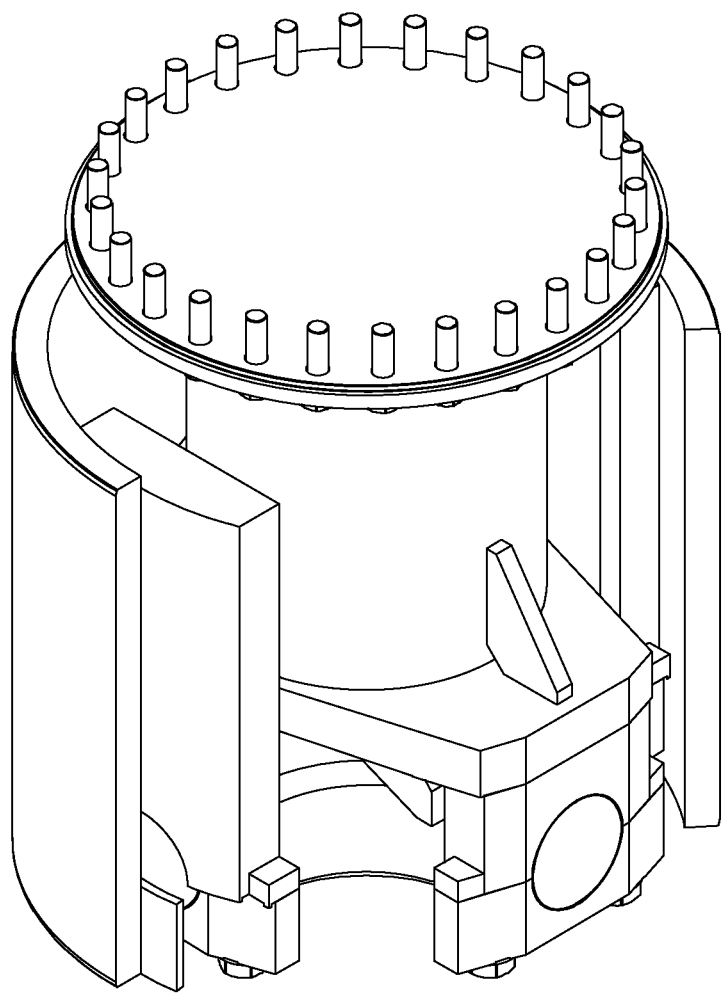
FIG. 3 is a perspective view of a gimbal joint provided at the base of one of the drive pistons, shown within its housing.
Figure 4:
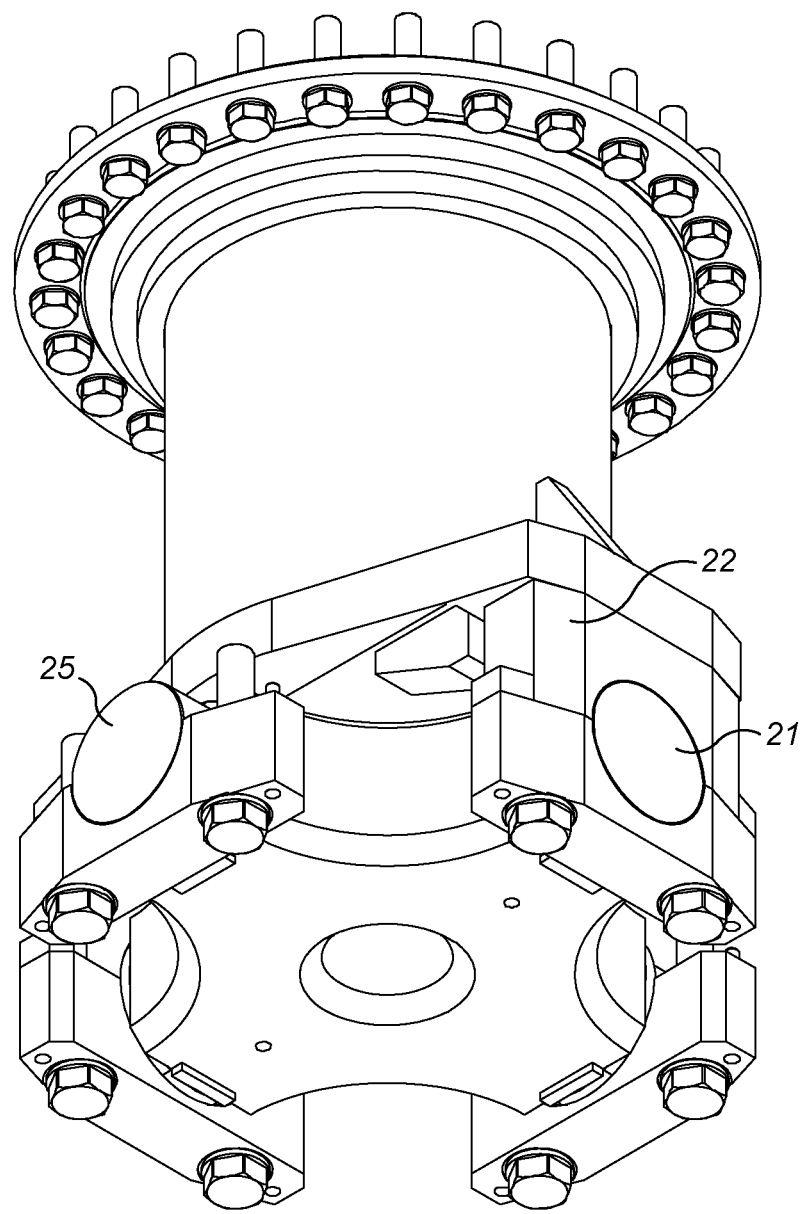
FIG. 4 is a view of the gimbal joint without the housing.
Figure 5:
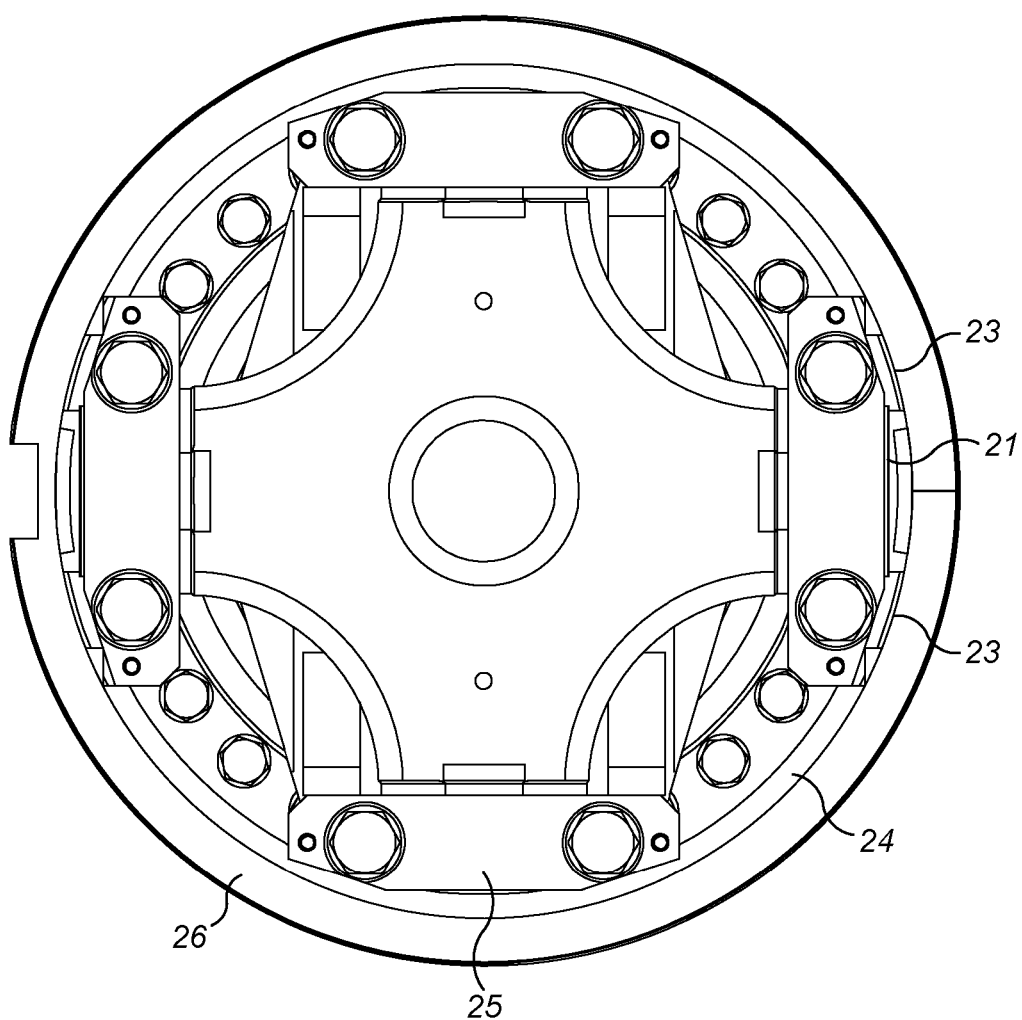
FIG. 5 is a plan view from below of the gimbal joint.

This example articulated gimbal type joint is shown in greater detail in FIGS. 3 to 5, with FIG. 3 illustrating a perspective view of a gimbal joint provided at the base of one of the drive pistons shown within a partially cutaway dual cylinder housing, FIG. 4 showing a perspective view of the gimbal joint from below without the housing, and FIG. 5 showing a plan view from below.

In the illustrated example joint a first pair of housed rollers (21) each has a housing the faces (22) of which are welded at four points (23) as shown in FIG. 5 to a first housing cylinder (24). The second pair of housed rollers (25) is free to rotate. The first housing cylinder (24) sits within a second housing cylinder (26). The two housing cylinders are relatively slideable. The ram can tilt at this joint with two degrees of freedom about two orthogonal axes in a plane parallel to the plane of the body, but it cannot rotate about its long axis. The arrangement achieves the objective of full tilt freedom about two orthogonal axes without rotational freedom in admirable manner. It thus resists torque loads arising from an imbalance away from the ideal condition of the payload.

The transporter is admirably suited to remote operation via suitable remote control means. It does not require driver operation via a cab integral to the transporter. In the described embodiment, the transporter includes a central control unit (not shown) controlled by remote user-operatable control means on a remote radio interface unit.

A possible method of operation is described below by way of example. The example method of operation is a method of remote operation via suitable remote control means.

It will be understood that this is merely an example operational regime for the example embodiment of transporter. The example embodiment of transporter is not limited to operation in accordance with such principles, and nor is the invention in general so limited. Both the embodiment of apparatus and the method of operation are for illustrative purposes.

In accordance with the example method of operation, three main operational modes are proposed. These are referred to herein Travel Mode, Lift Mode and Slew Mode. In the example, only one mode may be selected for operation at any one time. Selection between each mode is carried out by a selector switch mounted on the remote radio interface unit.

Travel Mode is used for moving the transporter without a payload. When selected to travel mode, controls such as paddles mounted on the remote radio handset may be used to independently control the transporter crawlers.

A convenient envisaged additional mode of operation for each crawler provides a "rotate" function. Upon operation, the right and left crawlers will move in opposite directions at an automatically matched speed enabling the tightest turning circle possible. It is envisaged that the rotate function will only be available from the remote radio handset when the transporter is at a complete standstill.

Once the transporter is in the correct position then Lift Mode can be selected and then an attempt to lift the payload can be carried out. A typical lift may consist of three stages, the first stage being preparing the payload the second being aligning the payload, and the third being lifting the payload ready for transporting.

Depending on the circumstances, there are various possible methods of preparing the payload for lifting. The payload may be supported in any suitable manner, for example directly on the upper table, indirectly via a lifting frame, or otherwise without departing from the principles of the invention.

Before any attempt to lift the payload is made, the theoretical COG of the payload should be known. Failure to position the transporter at the COG location may result in a failed lift attempt.

In a possible mode of operation, on selecting Lift Mode, the operator may be required to press and hold down a "dead man" switch in order for the system to initiate an automatic alignment with the payload. On operating the "dead man" switch, suitable control software will automatically raise the lifting apparatus until contact is made with the payload. Conveniently, hydraulic lifting rams may engage the load successively or progressively.

For example, a first hydraulic lifting ram may take the load first. When a load cell on the first hydraulic lifting ram sees a pre-determined active load then that ram will stop. Once the first ram has made such contact with the load then the next pair of adjacent rams will extend further until the rams see an equal pre-determined active load matching that of the first ram. Last, the remaining ram will continue rising until all four rams see an equal pre-determined active load. The pre-determined load will be limited to ensure that the payload will not be lifted until completion of stage 2 of the Lift phase is acknowledged by the operator.

When all rams are in position the load cells may feedback their information back to the central control system. This would enable a COG position to be determined and the results displayed on the remote radio handset user display. An operator would clearly be able to see the approximate position of the COG on the remote radio interface in relation to the actual safe working area.

If at any time during this stage a problem occurs and an alarm is raised then the lifting rams should return to their resting position until the source of the alarm can be rectified.

On completion any fixing between the upper table and payload must be made fast before the next stage can start. Once the apparatus is correctly aligned, the payload secured and the COG is within safe parameters, lifting may commence. It is envisaged that this may be executed automatically.

On execution of the automatic lifting stage, the rams will extend at the same rate to a predetermined height to ensure that the payload is lifted equally and that the COG remains stable. During this operation, if the limits of the COG range are exceeded then the system may be set up for an audible and/or visual warning to be sounded and/or for the lift to be inhibited. The rams may for example retract their original location allowing the operator to assess the situation before attempting any further operations.

When the payload has been successfully lifted to a predetermined height and all remains within acceptable operating parameters then the automated lift phase is completed and control is returned to the operator.

Once control has been returned to the operator it becomes operator responsibility to adjust the payload suitable for transporting to the new location. The remote radio handset may suitably incorporate variable paddles that allow the operator to carry out various commands associated with all functionality of the transporter.

Travel Mode is also used for moving the transporter with a payload. Control systems may provide that on completion of lift mode, the transporter will only be allowed to engage Travel Mode if the COG is within safe limits.

Controls such as paddles mounted on the remote radio handset may be used to independently control the transporter crawlers. For example there may be a paddle for operating each of the crawlers individually; when moving in a straight line both paddles will be pushed forward and the crawlers will turn at the speed proportional to the travel of each paddle. For instance, pushing the left paddle further than the right paddle will result in turning right whilst progressing forward. The greater the variance between the two paddles, the tighter the turning circle.

Whilst the transporter is crawling, the system enables constant monitoring of the COG which may be displayed on a remote radio interface display. In the event that a fault alarm condition is activated then the machine operation may be inhibited.

Typically, for safety, raising, lowering or slewing are not permitted and will be inhibited whilst the Transporter is crawling. In order to adjust the position of the payload, lift or slew mode must be engaged. In the example operational regime this can only be achieved by bringing the transporter to a complete stop and then selecting the desired operating mode.

The invention claimed is:

1. A transporter for the transport of a payload across an uneven ground surface, the transporter comprising:
    a body;
    a payload support module to support a payload above the body in use;
    an array of four elongate extendable elevators, each one of the four elongate extendable elevators having a rotationally restricted joint at a first end and a joint configured to allow three full degrees of freedom of rotation at a second end;
    wherein each of the four elongate extendable elevators is independently operable so as to enable the elongate extendable elevators together to vary both height and attitude of the payload relative to the body;
    wherein each of the four elongate extendable elevators comprises a load sensor; and
    wherein the rotationally restricted joint allows the elongate extendable elevator to pivot relative to an axis orthogonal to its elongate direction but acts to prevent its rotation about an axis parallel to its elongate direction.

2. The transporter in accordance with claim 1, wherein the elevators are positioned to project upwardly from the body in use and actuatable to extend to bear on the payload support module and support a payload thereon in use.

3. The transporter in accordance with claim 1 wherein each rotationally restricted joint is configured to allow the elongate extendable elevator to pivot relative to a pair of axes orthogonal to its elongate direction, and for example a pair of orthogonal axes, but to prevent its rotation about an axis parallel to its elongate direction.

4. The transporter in accordance with claim 1, wherein the rotationally restricted joint is a gimbal joint configured to prevent rotation of the elongate extendable elevator about an axis parallel to its elongate direction but to permit pivoting of the elongate extendable elevator about an axis perpendicular to its elongate direction.

5. The transporter in accordance with claim 1, wherein the rotationally restricted joint is a gimbal joint configured to permit pivoting of the elongate extendable elevator about a pair of axes orthogonal to its elongate direction.

6. The transporter in accordance with claim 5, wherein the gimbal joint comprises a pair of single axis gimbal modules one mounted upon the other with orthogonal pivot axes, thereby being such as to allow rotation about the said pair of pivot axes but not to allow rotation about a third axis perpendicular thereto.

7. The transporter in accordance with claim 1, wherein the joint configured to allow three full degrees of freedom of rotation is a ball joint.

8. The transporter in accordance with claim 1, wherein each of the rotationally restricted joints are between the body and a first end of the elongate extendable elevator.

9. The transporter in accordance with claim 8, wherein each of the joints configured to allow three full degrees of freedom of rotation are disposed between the payload support module and a second end of the elongate extendable elevator.

10. The transporter in accordance with claim 9, wherein each of the joints configured to allow three full degrees of freedom of rotation between the payload support module and the second end of the elongate extendable elevator are ball joints.

11. The transporter in accordance with claim 1, wherein each elevator has a load sensor linked to a common central control module, which common central control module is adapted to determine from the relative load on each elevator the location of the centre of gravity of the payload.

12. The transporter in accordance with claim 1, wherein the payload support module comprises a payload support platform and each elongate extendable elevator extends between the body and the payload support platform, and is actuatable to raise and lower the support platform in use and thereby raise and lower a payload thereon.

13. The transporter in accordance with claim 1, wherein each elevator comprises a ram, piston or like extending load-bearing structure.

14. The transporter in accordance with claim 13, wherein each elevator comprises a hydraulic ram or piston drive.

15. The transporter in accordance with claim 1, wherein the elevators are in a square array.

16. The transporter in accordance with claim 1, further comprising an alarm system to give indication of an unsafe or unstable configuration.

17. The transporter in accordance with claim 1, wherein the transporter is adapted to provide a slewing operation.

18. The transporter in accordance with claim 17, wherein the payload support module comprises two parts, with a lower support portion engaged with and tiltable by action of the extendable elevators, and an upper portion on which the payload is supported in use rotatable relative to the lower portion.

19. The transporter in accordance with claim 1, comprising a transversely spaced pair of ground contacting rolling drives on either side of a central body.

20. The transporter in accordance with claim 19, comprising a pair of crawler tracks located transversely either side of the central body.

* * * * *